(12) United States Patent
Lun

(10) Patent No.: US 10,176,149 B2
(45) Date of Patent: Jan. 8, 2019

(54) METHOD OF RENDERING VISUAL PRESENTATIONS OF DATA

(71) Applicant: Invexer Technology Inc., Ashburn, VA (US)

(72) Inventor: Lawrence Xuesen Lun, Ashburn, VA (US)

(73) Assignee: INVEXER TECHNOLOGY INC., Ashburn, VA (US)

( * ) Notice: Subject to any disclaimer, the term of this patent is extended or adjusted under 35 U.S.C. 154(b) by 0 days.

(21) Appl. No.: 15/972,323

(22) Filed: May 7, 2018

(65) Prior Publication Data

US 2018/0322100 A1 Nov. 8, 2018

Related U.S. Application Data

(60) Provisional application No. 62/502,698, filed on May 7, 2017.

(51) Int. Cl.
G06F 17/21 (2006.01)

(52) U.S. Cl.
CPC .......... *G06F 17/212* (2013.01); *G06F 17/217* (2013.01)

(58) Field of Classification Search
CPC .................................................. G06F 17/212
USPC ......................................................... 715/201
See application file for complete search history.

(56) References Cited

U.S. PATENT DOCUMENTS

| | | | |
|---|---|---|---|
| 5,745,596 A | 4/1998 | Jefferson | |
| 7,278,094 B1 * | 10/2007 | Dreyer | G06F 17/248 |
| | | | 715/234 |
| 9,922,007 B1 * | 3/2018 | Jain | G06F 17/2247 |
| 2002/0170068 A1 | 11/2002 | Rafey et al. | |
| 2007/0186163 A1 | 8/2007 | Yeh et al. | |
| 2009/0119717 A1 | 5/2009 | Newton et al. | |
| 2015/0082349 A1 | 3/2015 | Ishtiaq et al. | |
| 2015/0185994 A1 * | 7/2015 | Antipa | G06F 17/2247 |
| | | | 715/201 |

OTHER PUBLICATIONS

Oxford Dictionary of Computing, p. 541, Oxford University Press, 2008 (Year: 2008).*
Bolin, Michael, Matthew Webber, Philip Rha, Tom Wilson, and Robert C. Miller. "Automation and customization of rendered web pages." In Proceedings of the 18th annual ACM symposium on User interface software and technology, pp. 163-172. ACM, 2005. (Year: 2005).*

* cited by examiner

*Primary Examiner* — Frank D Mills
(74) *Attorney, Agent, or Firm* — Qian Gu; Na Xu; IPro, PLLC

(57) ABSTRACT

Disclosed herein is a method comprising: generating a modified description from an initial description of a set of visual presentations of data, by replacing at least one visual presentation in the set with a visual presentation of a textual key; generating a first render of the data based on the initial description; generating a second render of the data based on the modified description; identifying a first portion in the first render, the first portion encompassing visual display of data of the at least one visual presentation; replacing, using a computing device, a second portion in the second render with the first portion, the second portion encompassing visual display of the textual key.

22 Claims, 8 Drawing Sheets

10,176,149 B2

METHOD OF RENDERING VISUAL PRESENTATIONS OF DATA

CROSS-REFERENCE TO RELATED APPLICATIONS

The content of U.S. Provisional Application No. 62/502698 is hereby incorporated by reference in its entirety.

BACKGROUND

In digital printing and desktop publishing, the visual appearance of a page to be printed on a tangible medium can be described digitally. An intuitive approach to describe the visual appearance of the page is by explicitly defining the color (e.g., using the CMYK color model) of each pixel of the page. Namely, the page may be treated as a raster image. However, this intuitive approach is inflexible, may dissociate the visual appearance of the page from data structures defining the contents of the page, and may make manipulating the visual appearance difficult.

The visual appearance of the page may be described at a higher level of abstraction than defining each pixel. The description of the visual appearance of the page may define characteristics of the contents of the page rather than the exact visual appearance of the contents. In an example where one content of the page is a textual string, the description may define codes of the letters in the textual string (e.g., ASCII code, Unicode), the fonts of the letters, the variations of the fonts (e.g., height, width, weight, and slope), etc. In another example where one content of the page is a shape, the description may define parameters of a mathematical formula specifying the curve encompassing the shape, the style of fill (e.g., fill color, transparency) of the shape, the style of the curve (e.g., color, weight), etc. When the page is printed, the description is rendered to produce the visual appearance of the page.

One issue of this description at the higher level of abstraction is that the data structures defining the contents of the page and the description of the visual appearance of the page are often quite different in format. Achieving WYSI-WYG ("what you see is what you get") from the data structures defining the contents of the page to the description of the visual appearance of the page is not always straightforward.

SUMMARY

Disclosed herein is a method comprising: generating a modified description from an initial description of a set of visual presentations of data, by replacing at least one visual presentation in the set with a visual presentation of a textual key; generating a first render of the data based on the initial description; generating a second render of the data based on the modified description; identifying a first portion in the first render, the first portion encompassing visual display of data of the at least one visual presentation; replacing, using a computing device, a second portion in the second render with the first portion, the second portion encompassing visual display of the textual key.

According to an embodiment, when the set of visual presentations of data comprises a visual presentation of formatted texts and a visual display of the formatted texts is unformatted in the second render, the method may further comprise formatting the visual display of the formatted texts in the second render based on the initial description.

The method of claim 1, further comprising identifying the second portion in the second render based on the textual key.

According to an embodiment, generating the modified description is further by identifying the at least one visual presentation from the initial description.

According to an embodiment, the method further comprises labeling the first portion with the textual key.

According to an embodiment, replacing the second portion comprises matching the first portion and the visual display of the textual key based on the textual key.

According to an embodiment, the second render is paginated.

According to an embodiment, the second render comprises a header or a footer.

According to an embodiment, the method further comprises comprising scaling the first portion.

According to an embodiment, replacing the second portion comprises aligning the first portion to the second portion.

According to an embodiment, generating the first render is by using a headless browser.

Disclosed herein is a non-transitory computer readable medium having instructions recorded thereon, the instructions when executed by a computer device implementing any of the methods above.

DETAILED DESCRIPTION

In certain web-based applications (e.g., those offered by MicroStrategy), a server may obtain data from a database in response to a user's request; the server or a client may generate a render of the data based on a description (e.g., a MicroStrategy Report Services Document) of a visual presentation of the data; and the render may be then displayed on a screen of the client or printed on a tangible medium. The visual presentation of the data may be interactive. Namely, the visual presentation of data may respond to the user's input on the client. Generating the render of the data for displaying on the screen and generating the render for printing on a tangible medium may be quite different.

Figure 1:
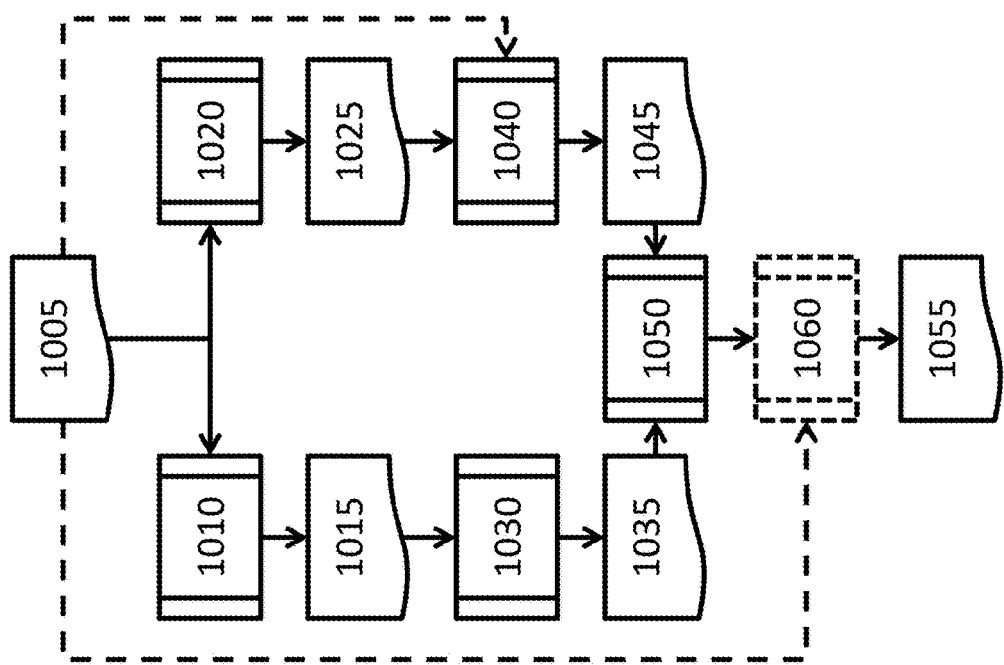
FIG. 1 schematically shows a flowchart for a method, according to an embodiment.

FIG. 1 schematically shows a flowchart for a method, according to an embodiment. In procedure 1010, a modified description 1015 of a set of visual presentations of data is generated from an initial description 1005 of the set of visual presentations of data, by replacing at least one visual presentation in the set with a visual presentation of a textual key. The initial description 1005 and the modified description 1015 may be in any suitable form. One example of the initial description 1005 and the modified description 1015 is a MicroStrategy Report Services Document. A visual presentation of data may be the form in which the data are presented to a human. Examples of a visual presentation may include a table, a histogram, a geographical map, a scatter plot, a line graph, a bar chart, and a pie chart. A visual presentation may be other suitable forms. The description (e.g., the initial description 1005 or the modified description 1015) of a visual presentation may define characteristics of the visual presentation. In an example where the visual presentation is a scatter plot, the description may define characteristics of the scatter plot such as bounds, units, tick marks, labels, data point markers, trendlines, etc. A textual key may be a unique string of text (e.g., a string of letters, symbols, numbers, and their combinations). The visual presentation of the textual key may simply be plain text of the textual key. The textual key may be used to identify the replaced visual presentation in the subsequent procedures in the flowchart.

Figure 2:
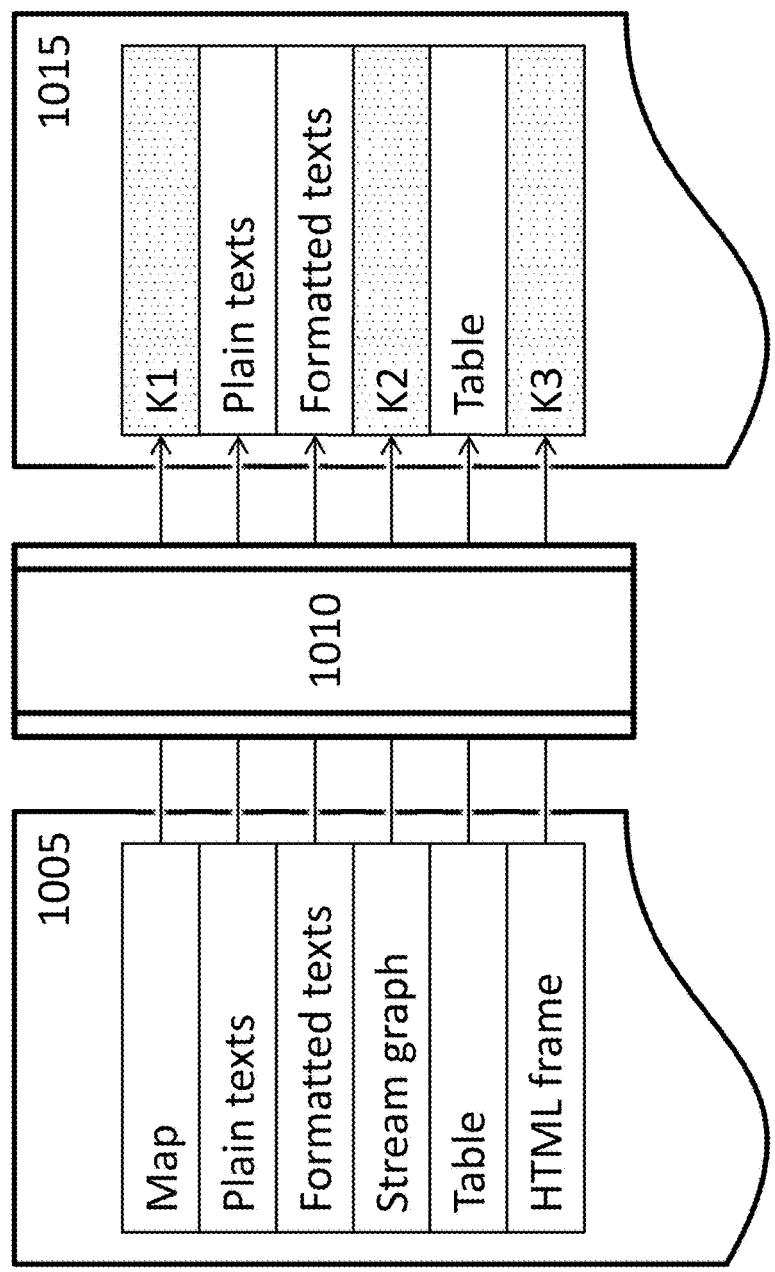
FIG. 2, FIG. 3, FIG. 4, FIG. 5, FIG. 6 and FIG. 7 each schematically show a procedure in FIG. 1, according to an embodiment.

FIG. 2 schematically shows the generation of the modified description 1015 from the initial description 1005, in procedure 1010. Whether a visual presentation of data is replaced with a visual presentation of a textual key may be determined based on the type of the visual presentation of data. The visual presentations of data of those types that are difficult to render for printing on a tangible medium are suitable candidates for this replacement. In the example shown here, a visual presentation that is a map, a visual presentation that is a stream graph, and a visual presentation that is an HTML frame are identified from the initial description 1005 and respectively replaced with visual presentations of textual keys K1, K2 and K3.

As further shown in FIG. 1, in procedure 1020, a first render 1025 of the data is generated based on the initial description 1005. A render is a visual display (e.g., an image on a printed page or on a screen) a human can observe. Generation of the first render 1025 may be a process of determining the colors of all pixels in the visual display based on the initial description 1005.

Figure 3:
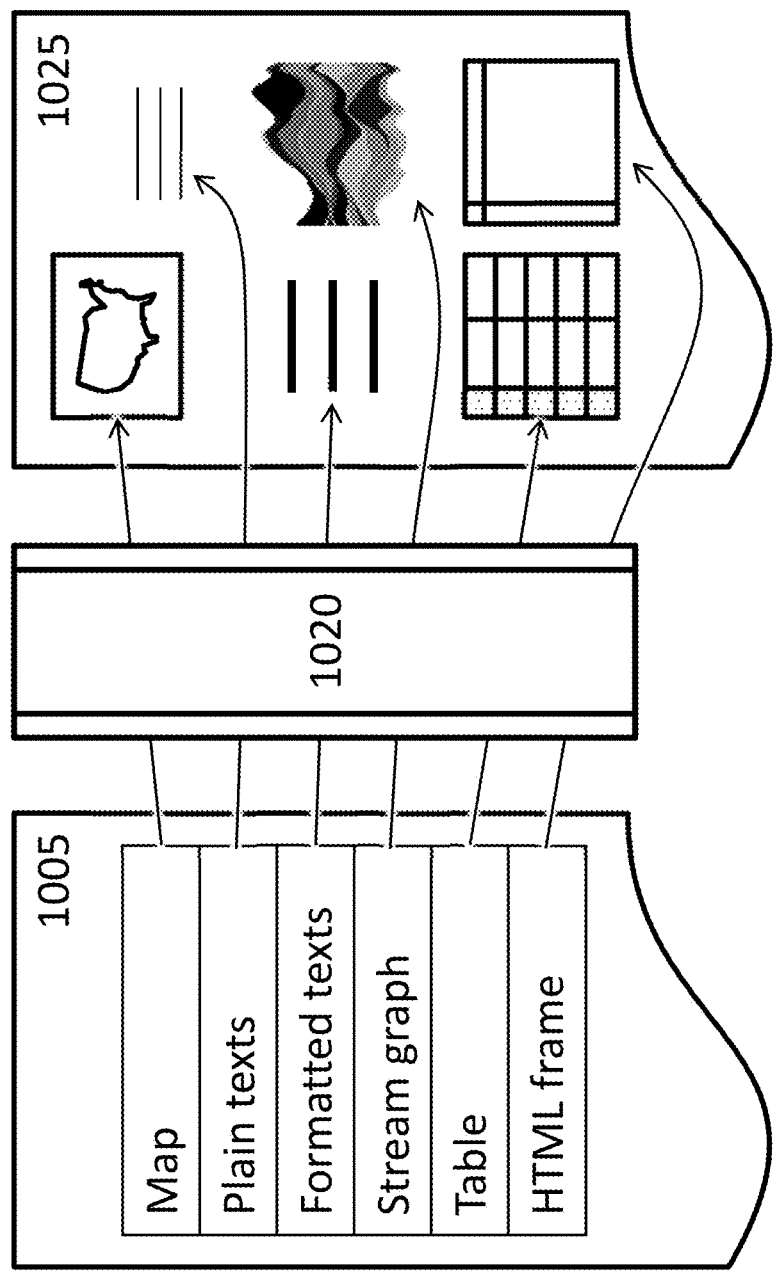

FIG. 3 schematically shows the generation of the first render 1025 based on the initial description 1005, in procedure 1020. The generation of the first render 1025 may be by using a headless browser. A headless browser is a web browser without a graphical user interface. One example of a headless browser is PhantomJS. Some web browsers such as Google Chrome and Mozilla Firefox have a headless mode. The set of visual presentations of data in the initial description 1005 is used to determine visual displays (e.g., images) of the data, which are then arranged or transformed to produce the first render 1025. In the example shown in FIG. 3, an actual map, an actual stream graph, an actual HTML frame, etc., having the characteristics describing them in the initial description 1005 are included in the first render 1025.

Figure 4:
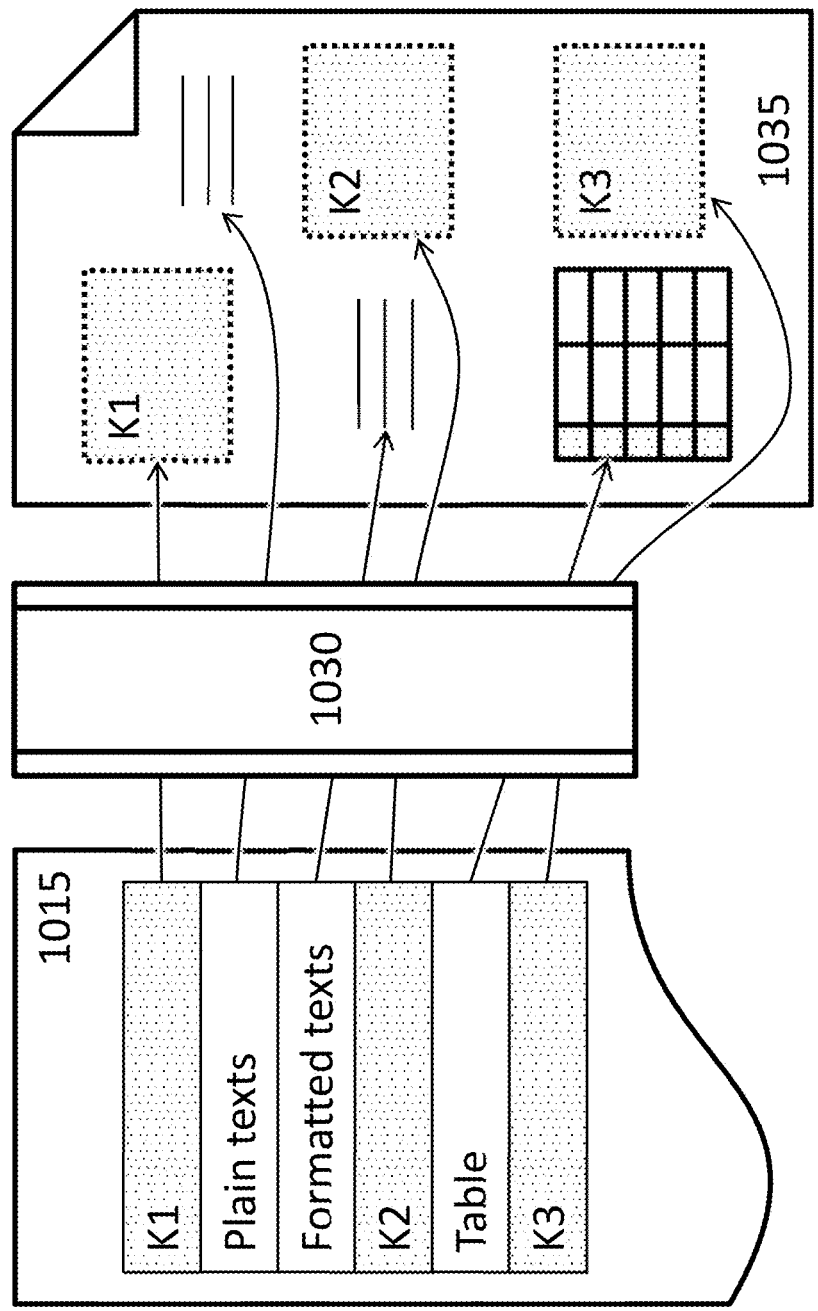

As further shown in FIG. 1, in procedure 1030, a second render 1035 of the data is generated based on the modified description 1015. FIG. 4 schematically shows the generation of the second render 1035 based on the modified description 1015, in procedure 1030. The second render 1035 may be in any suitable format. One example of the second render 1035 is a document in the Portable Document Format (PDF). In an example, the second render 1035 is paginated and may have a header or a footer, which may include additional information such as page numbers. The set of visual presentations of data in the modified description 1015 is used to determine visual displays (e.g., images) of the data, which are then arranged or transformed to produce the second render 1035. In the example shown in FIG. 4, visual displays of the data whose visual presentations are not replaced in procedure 1010, e.g., the plain texts and the table, having the characteristics describing them in the modified description 1015 are in the second render 1035. Although the formatted texts in this example as a visual presentation are not replaced in procedure 1010, visual display of formatted texts may be unformatted in the second render 1035. Areas in the second render 1035 that would be occupied by visual displays of the data whose visual presentations are replaced with textual keys in procedure 1010, i.e., the map, the stream graph and the HTML frame, are now occupied by visual displays (e.g., plain texts) of the textual keys K1, K2 and K3.

Figure 5:
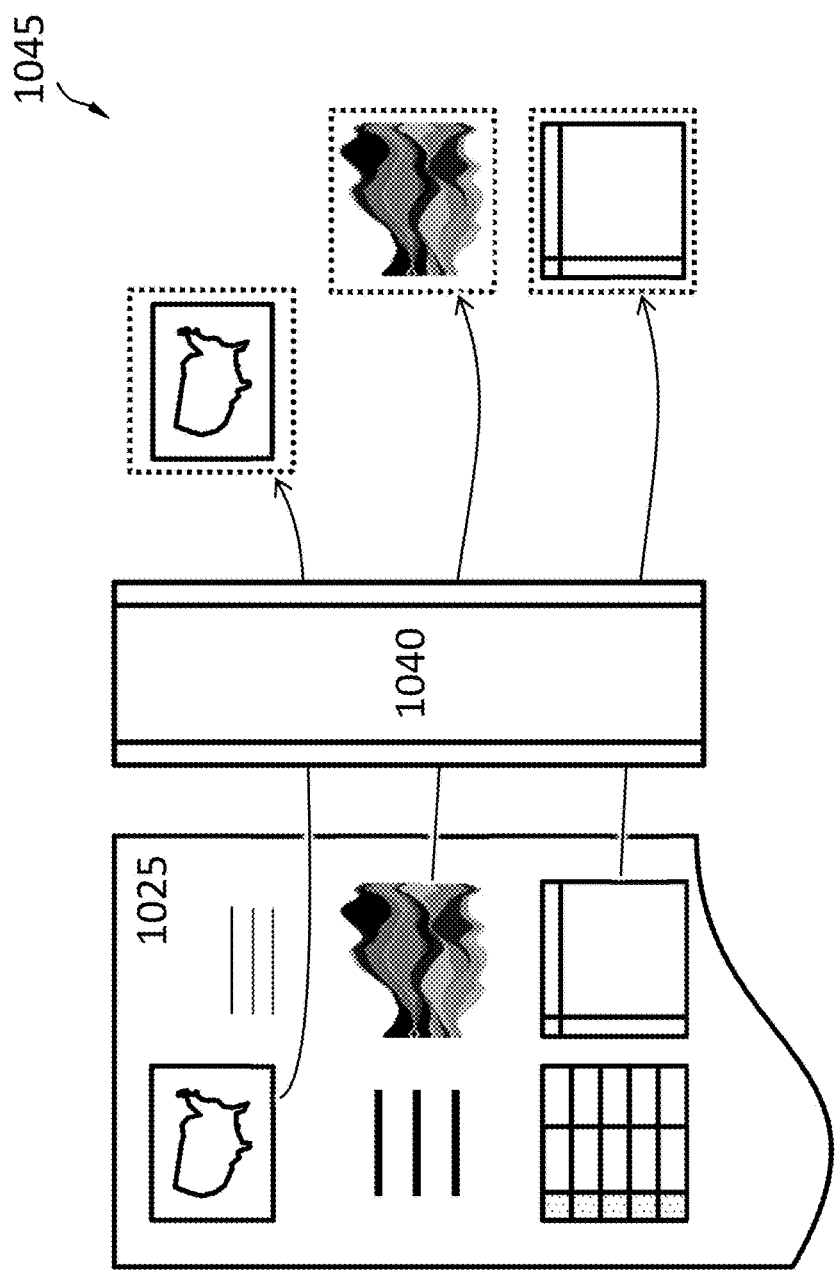

As further shown in FIG. 1, in procedure 1040, a first portion 1045 is identified in the first render 1025, which may be based on the initial description 1005. FIG. 5 schematically shows the identification of the first portion 1045 in the first render 1025. The first portion 1045 identified from the first render 1025 may encompass the visual displays of the data whose visual presentations are replaced with the textual keys in procedure 1010, i.e., the map, the stream graph and the HTML frame in the example shown. The first portion 1045 may have discrete parts. For example, the first portion 1045 include multiple images (in a format such as JPEG or PNG) extracted from the first render 1025. The first portion 1045 may be labeled by the textual keys. For example, the part of the first portion 1045 encompassing the visual display of the map may be labeled by the textual key K1; the part of the first portion 1045 encompassing the visual display of the stream graph may be labeled by the textual key K2; and the part of the first portion 1045 encompassing the visual display of the HTML frame may be labeled by the textual key K3.

Figure 6:
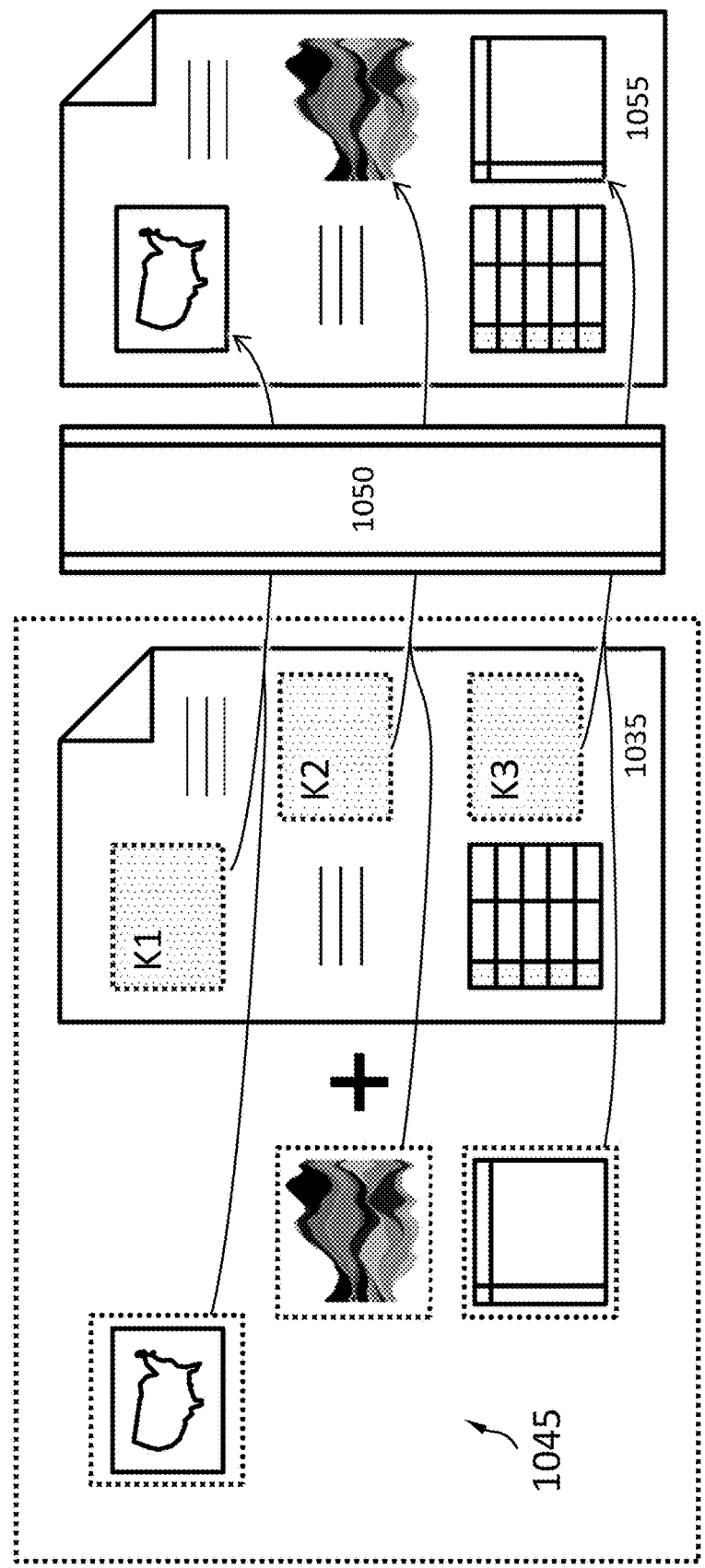

As further shown in FIG. 1, in procedure 1050, a third render 1055 is generated by replacing a second portion in the second render 1035 with the first portion 1045. The second portion may be identified based on the textual keys. For example, the second portion encompasses the visual displays of the textual keys. The third render 1055 may be in any suitable format. One example of the third render 1055 is a document in the Portable Document Format (PDF). FIG. 6 schematically shows the replacement of the second portion with the first portion 1045. The visual displays of the textual keys K1, K2 and K3 in the second render 1035 may be identified using the textual keys K1, K2 and K3 and included in the second portion. The first portion 1045 labeled by the textual keys K1, K2 and K3 and the visual displays of the textual keys K1, K2 and K3 may be matched by the textual keys K1, K2 and K3. For example, the visual display of textual key K1 is replaced by the image of the map, which is labeled by the textual key K1. The first portion may be scaled or aligned to the second portion before it replaces the second portion.

Figure 7:
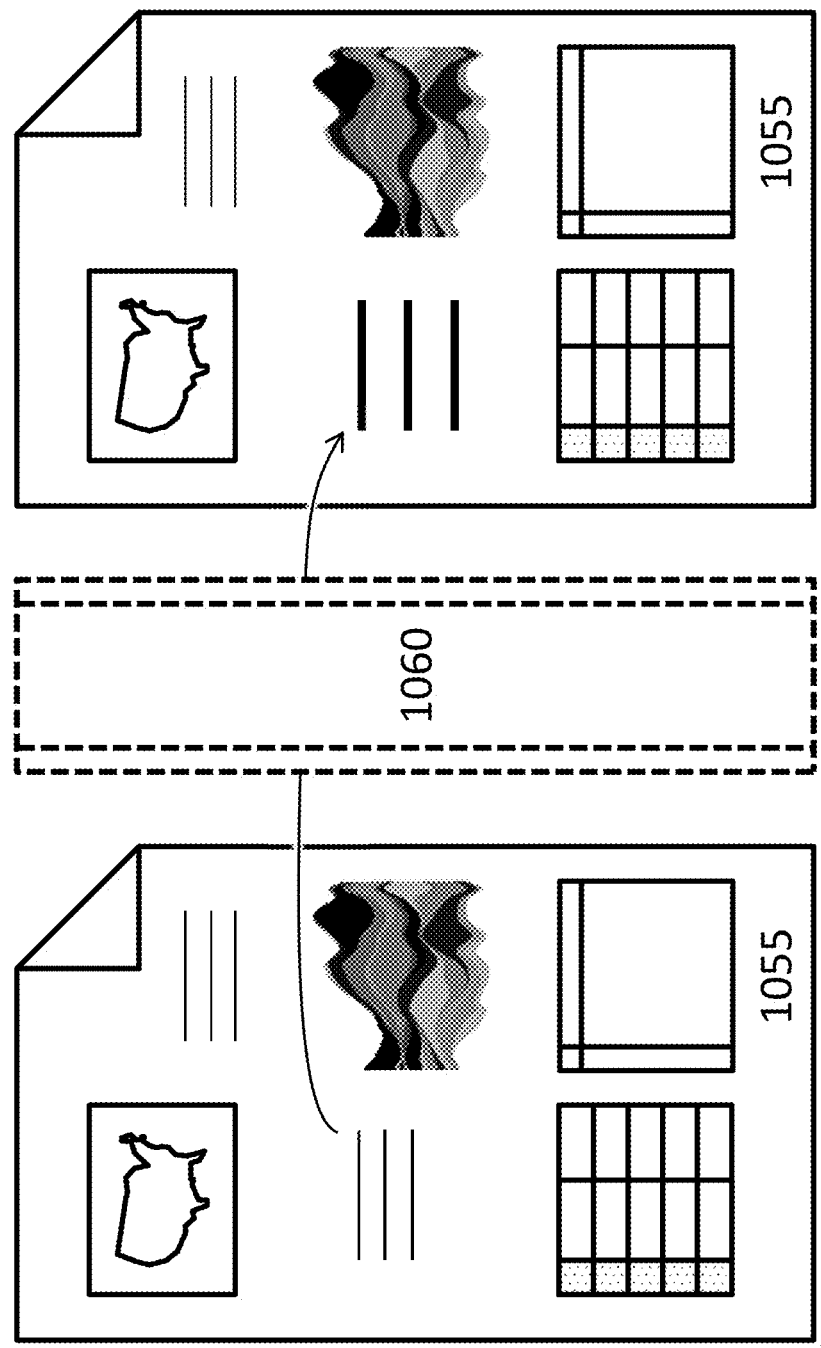

As further shown in FIG. 1, when the set of visual presentations of data includes a visual presentation of formatted texts and the visual display of the formatted texts is unformatted in the second render 1035, an optional procedure 1060 may be carried out, in which the third render 1055 is generated further by formatting the visual display of the formatted texts in the second render 1035 based on the initial description 1005. FIG. 7 schematically shows the formatting of the visual display of the formatted texts in the second render, in the optional procedure 1060. For example, characteristics of the formatting of the formatted texts, e.g., font, height, width, weight, slope, indentation, line spacing, etc. in the initial description 1005 may be applied to the visual display of the formatted texts in the second render 1035.

The function of performing any of the procedures in the flowchart of FIG. 1 may be implemented in a computing device.

Figure 8:
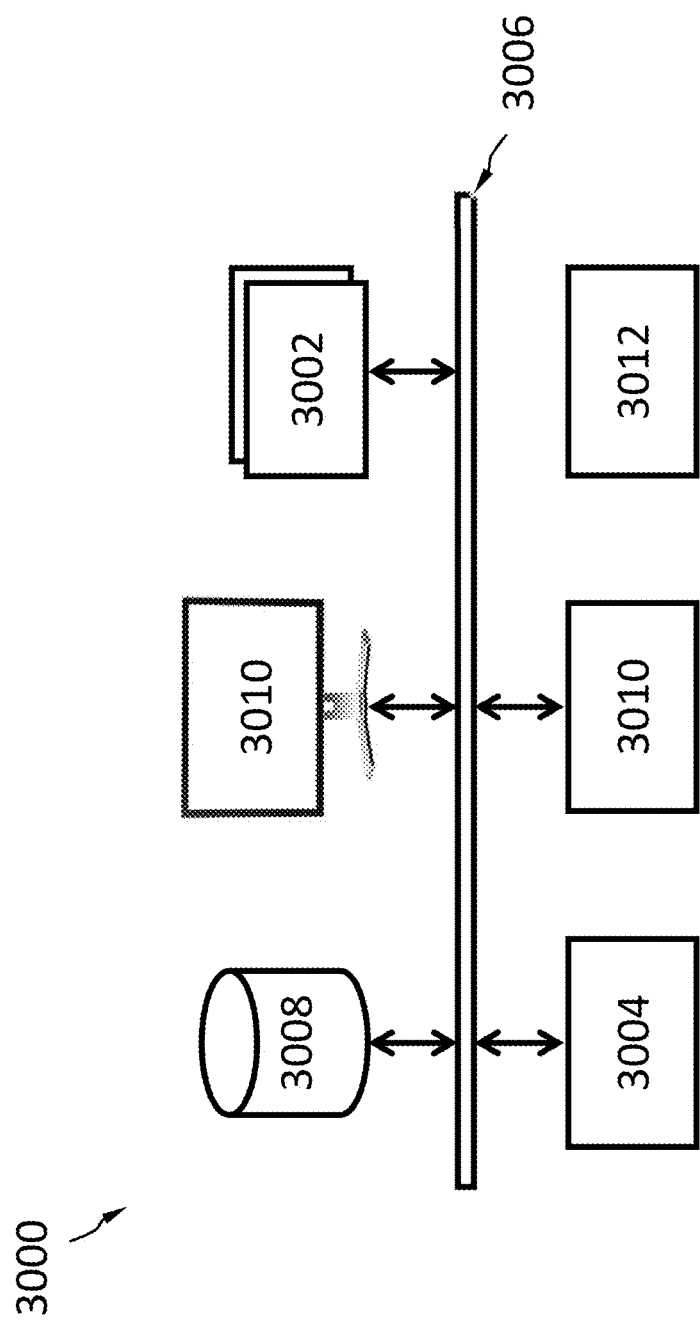
FIG. 8 depicts an architecture of a computing device.

FIG. 8 depicts an architecture of a computing device 3000. This computing device 3000 can be used to implement any procedures described herein, via its hardware, software program, firmware, or a combination thereof. Although only one such computing device is shown, for convenience, the computing device may have multiple processors, which may be distributed in more than one geographical location.

The computing device 3000 may include a communication port 3002 connected with a network. The computing device 3000 may include a central processing unit (CPU) 3004, which may have one or more physical processors. The computing device 3000 may include an internal communication bus 3006, a non-transitory computer readable medium 3008. The non-transitory computer readable medium 3008 may have instructions recorded thereon, the instructions when executed implementing a method disclosed herein. The computing device 3000 may include a screen 3010 configured to show the first render 1025, the second render 1035 or the third render 1055. The computing device 3000 may include a printer 3012 configured to print a tangible medium carrying the first render 1025, the second render 1035 or the third render 1055.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
generating a modified description from an initial description of a set of visual presentations of data, by replacing at least one visual presentation in the set with a visual presentation of a textual key, the textual key being a string of text;
generating, by using a headless browser, a first render of the data based on the initial description, the first render comprising visual display of data of the at least one visual presentation;
generating a second render of the data, based on the modified description, the second render being in the Portable Document Format (PDF) and comprising a visual display of the textual key;
identifying a first portion in the first render based on the initial description, the first portion encompassing the visual display of data of the at least one visual presentation;
generating a third render in the PDF by replacing, using a computing device, a second portion in the second render with the first portion, the second portion encompassing the visual display of the textual key.

2. The method of claim 1, wherein the set of visual presentations of data comprises a visual presentation of formatted texts and a visual display of the formatted texts is unformatted in the second render; the method further comprising formatting the visual display of the formatted texts in the second render based on the initial description.

3. The method of claim 1, further comprising identifying the second portion in the second render based on the textual key.

4. The method of claim 1, wherein generating the modified description is further by identifying the at least one visual presentation from the initial description.

5. The method of claim 1, further comprising labeling the first portion with the textual key.

6. The method of claim 5, wherein replacing the second portion comprises matching the first portion and the visual display of the textual key based on the textual key.

7. The method of claim 1, wherein the second render is paginated.

8. The method of claim 1, wherein the second render comprises a header or a footer.

9. The method of claim 1, wherein replacing the second portion with the first portion comprises scaling the first portion.

10. The method of claim 1, wherein replacing the second portion comprises aligning the first portion to the second portion.

11. The method of claim 1, wherein generating the first render comprises determining colors of all pixels of the first render.

12. A non-transitory computer readable medium having instructions recorded thereon, the instructions when executed by a computer device implementing a method comprising:
generating a modified description from an initial description of a set of visual presentations of data, by replacing at least one visual presentation in the set with a visual presentation of a textual key, the textual key being a string of text;
generating, by using a headless browser, a first render of the data based on the initial description, the first render comprising visual display of data of the at least one visual presentation;
generating a second render of the data based on the modified description, the second render being in the Portable Document Format (PDF) and comprising a visual display of the textual key;
identifying a first portion in the first render based on the initial description, the first portion encompassing the visual display of data of the at least one visual presentation;
generating a third render in the PDF by replacing, using a computing device, a second portion in the second render with the first portion, the second portion encompassing the visual display of the textual key.

13. The non-transitory computer readable medium of claim 12, wherein the set of visual presentations of data comprises a visual presentation of formatted texts and a visual display of the formatted texts is unformatted in the second render; the method further comprising formatting the visual display of the formatted texts in the second render based on the initial description.

14. The non-transitory computer readable medium of claim 12, wherein the method further comprises identifying the second portion in the second render based on the textual key.

15. The non-transitory computer readable medium of claim 12, wherein generating the modified description is further by identifying the at least one visual presentation from the initial description.

16. The non-transitory computer readable medium of claim 12, wherein the method further comprises labeling the first portion with the textual key.

17. The non-transitory computer readable medium of claim 16 wherein replacing the second portion comprises matching the first portion and the visual display of the textual key based on the textual key.

18. The non-transitory computer readable medium of claim 12, wherein the second render is paginated.

19. The non-transitory computer readable medium of claim 12, wherein the second render comprises a header or a footer.

20. The non-transitory computer readable medium of claim 12, wherein replacing the second portion with the first portion comprises scaling the first portion.

21. The non-transitory computer readable medium of claim 12, wherein replacing the second portion comprises aligning the first portion to the second portion.

22. The non-transitory computer readable medium of claim 12, wherein generating the first render comprises determining colors of all pixels of the first render.

* * * * *